United States Patent
Benton (10) Patent No.: US 11,425,920 B2
(45) Date of Patent: Aug. 30, 2022

(54) METHODS AND SYSTEMS FOR PRODUCING FROZEN COCKTAIL ICE STRUCTURES

(71) Applicant: Cadence Gourmet LLC, Corona, CA (US)

(72) Inventor: Michael Benton, Corona, CA (US)

(73) Assignee: DRINKWELL LLC, Hidden Hills, CA (US)

( * ) Notice: Subject to any disclaimer, the term of this patent is extended or adjusted under 35 U.S.C. 154(b) by 249 days.

(21) Appl. No.: 16/890,214

(22) Filed: Jun. 2, 2020

(65) Prior Publication Data
US 2020/0404945 A1 Dec. 31, 2020

Related U.S. Application Data

(60) Provisional application No. 62/868,723, filed on Jun. 28, 2019.

(51) Int. Cl.
| | | |
|---|---|---|
| A23G 9/48 | (2006.01) | |
| A23G 9/08 | (2006.01) | |
| A23G 9/22 | (2006.01) | |
| C12G 3/06 | (2006.01) | |
| A23G 9/04 | (2006.01) | |
| C12G 3/005 | (2019.01) | |
| A23G 9/24 | (2006.01) | |

(52) U.S. Cl.
CPC .............. *A23G 9/48* (2013.01); *A23G 9/045* (2013.01); *A23G 9/086* (2013.01); *A23G 9/228* (2013.01); *A23G 9/245* (2013.01); *C12G 3/005* (2013.01); *C12G 3/06* (2013.01)

(58) Field of Classification Search
CPC .......... A23G 9/48; A23G 9/045; A23G 9/086; A23G 9/228; A23G 9/245; C12G 3/005; C12G 3/06; F25C 1/00; F25D 3/10
See application file for complete search history.

(56) References Cited

U.S. PATENT DOCUMENTS 3,607,313 A * 9/1971 Roth .................. A23B 7/05
118/19
5,911,827 A * 6/1999 Heller .................. A23L 3/375
118/69

(Continued)

OTHER PUBLICATIONS

International Search Report dated Sep. 4, 2020 for related PCT Application No. PCT/US2020/035677.

(Continued)

*Primary Examiner* — Emmanuel E Duke
(74) *Attorney, Agent, or Firm* — Klein, O'Neill & Singh, LLP (57) ABSTRACT

Methods and systems for producing cocktail ice cubes are provided. One method includes setting a temperature of an interior surface of a tumbler below a desired temperature for an ice structure loaded into the tumbler; executing a sauce coating cycle for coating the ice structure with a sauce; executing a freeze cycle after the sauce coating cycle, by spraying nitrogen on the ice structure; alternating between the sauce coating cycle and the freeze cycle for applying sauce on the ice structure; and executing a water cycle for applying water to the ice structure coated with the sauce to produce a frozen cocktail ice structure.

20 Claims, 5 Drawing Sheets

(56) References Cited

U.S. PATENT DOCUMENTS

| | | | | |
|---|---|---|---|---|
| 5,958,481 A | * | 9/1999 | Hodges | F25C 1/18 |
| | | | | 426/100 |
| 6,007,859 A | * | 12/1999 | Taylor | A23B 4/10 |
| | | | | 366/147 |
| 6,235,330 B1 | | 5/2001 | Scherpf et al. | |
| 6,279,328 B1 | | 8/2001 | Leeds | |
| 6,770,312 B1 | | 8/2004 | Yamamoto et al. | |
| 2005/0008754 A1 | | 1/2005 | Sweeney et al. | |
| 2011/0300264 A1 | | 12/2011 | Neta et al. | |
| 2017/0115993 A1 | | 4/2017 | Sutton, II et al. | |

OTHER PUBLICATIONS

Written Opinion dated Sep. 4, 2020 for related PCT Application No. PCT/US2020/035677.

* cited by examiner

METHODS AND SYSTEMS FOR PRODUCING FROZEN COCKTAIL ICE STRUCTURES

CROSS-REFERENCE TO RELATED APPLICATION

This patent application claims priority under 35 USC § 119 (e) to U.S. Provisional Patent Application Ser. No. 62/868,723, filed on Jun. 28, 2019, the disclosure of which is incorporated herein by reference in its entirety.

TECHNICAL FIELD

The present disclosure relates to technology for producing frozen cocktail ice structures.

BACKGROUND

In the current state of the art it is difficult to produce a cocktail ice structure (e.g. an ice cube) that can be easily used for making a drink, e.g. a margarita, a smoothie or any other drink type. One challenge with refreezing or "enrobing" ice cubes is that ice typically fractures below sub-zero temperatures. Due to the fracture, ice chunks are created that may not be suitable for preparing a cocktail drink. Continuous efforts are being made to develop technology for efficiently producing cocktail ice structures that can easily be used to make a cocktail drink, without fracturing the ice during the cocktail ice structure production process.

SUMMARY

In one aspect of the present disclosure, a method for producing a frozen cocktail ice structure is provided. The method includes: setting a temperature of an interior surface of a tumbler below a desired temperature for an ice structure loaded into the tumbler; executing a sauce coating cycle for coating the ice structure with a sauce; executing a freeze cycle after the sauce coating cycle, by spraying nitrogen on the ice structure; alternating between the sauce coating cycle and the freeze cycle for applying sauce on the ice structure; and executing a water cycle for applying water on the ice structure coated with the sauce to produce a frozen cocktail ice structure.

In another aspect, a system is provided. The system includes a tumbler for receiving at least one ice structure; and a controller having a processor executing instructions out of a memory for: alternating a sauce coating cycle that applies a sauce layer on the ice structure and a freeze cycle that occurs after the sauce coating cycle to spray nitrogen on the ice structure; and executing a water cycle for applying water on the ice structure coated with sauce for producing a frozen cocktail ice structure having sauce coated on the ice structure.

In yet another aspect, a frozen cocktail ice structure is provided. The frozen cocktail ice structure includes an ice structure coated with a plurality of sauce layers. The ice structure is coated with a first sauce layer during a sauce coating cycle, and after the sauce coating cycle, nitrogen is sprayed on the ice structure during a freeze cycle. The sauce coating cycle and the freeze cycle alternate for applying a plurality of sauce layers and nitrogen on the ice structure; and after a last freeze cycle, water is applied on the ice structure coated with the plurality of sauce layers.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures.

DETAILED DESCRIPTION

In one aspect, innovative technology is provided for efficiently producing frozen cocktail ice structures. The technology enables application of different ingredients as "sauce layers" on ice structures during a sauce coating cycle. A freeze cycle applies nitrogen on the ice structure coated with one or more sauce layers. The sauce coating and freeze cycles alternate until a desirable number of sauce layers have been applied. A water cycle applies water on the ice structure coated with the frozen sauce. The ice structures with the sauce maybe used to make a drink. The following describes the innovative systems and processes for manufacturing the frozen cocktail ice structures.

Figure 1:
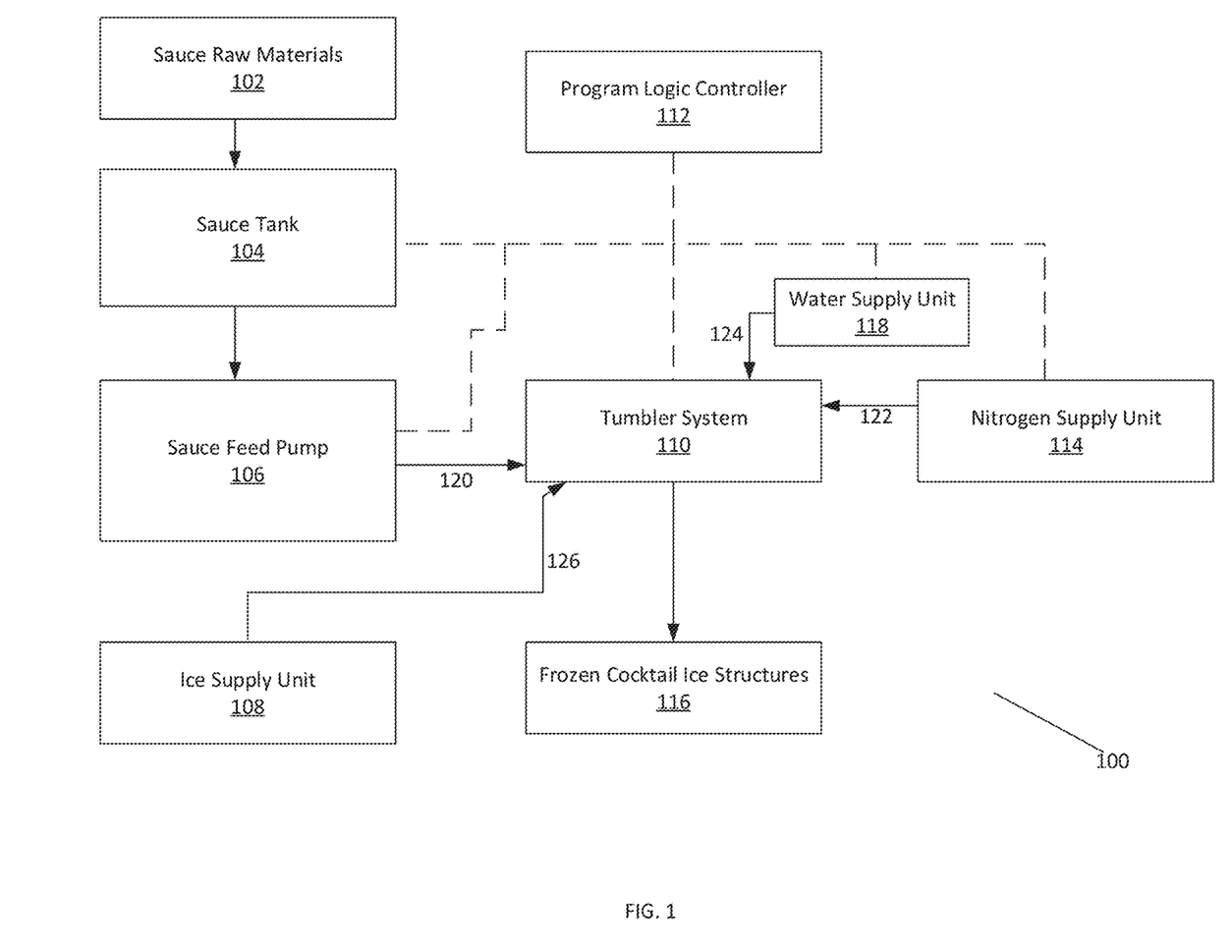
FIG. 1 shows an example of a system for executing the various aspects of the present disclosure.

System 100: FIG. 1 shows an example of a system 100 for producing frozen, craft ice structures, according to one aspect of the present disclosure. It is noteworthy that although the description below may refer to ice cubes, the various adaptive aspects of the present disclosure are not limited to ice cubes, and are equally applicable to other shapes, e.g. solid cylindrical shaped ice structures, hollow cylindrical shaped ice structures, cone shaped ice structures, or any other shape. The frozen, craft ice structures are covered with one or more ingredients that can be used to create a drink. The ingredients depend on a recipe based on user preference. The adaptive aspects disclosed herein are not limited to any specific recipe or ingredient.

In one aspect, system 100 includes: (i) a sauce tank 104 where sauce raw materials 102 are mixed, (ii) a sauce feed pump 106 that pumps sauce 120 from sauce tank 104, (iii) an ice supply unit 108 that supplies ice 126, (iv) a nitrogen supply unit 114 that supplies nitrogen 122, and (v) a water supply unit 118 that supplies water 118. The sauce 120, ice 126, nitrogen 122 and water 124 are provided to a tumbler system 110 in a sequence, as described below in detail with respect to FIG. 2A.

The operations of these various components, namely, the sauce tank 104, sauce feed pump 106, ice supply unit 108, water supply unit 118, the nitrogen supply unit 114, and the tumbler system 110 is controlled and managed by a program logic controller (PLC) 112, as described below in detail.

In one aspect, as an example, the sauce tank 104 is configured to receive the sauce raw materials 102. The sauce raw materials 102 vary based on a recipe. As an example, the sauce tank 104 maybe a 1400 gallon (i.e. 194 cube inch), stainless steel tank with a coned bottom and 2" outlet. The sauce tank 104 may include a stainless-steel high shear mixer operating at about 1750 RPM (revolutions per minute), using 3 phase, 480 volt. It is noteworthy that the sauce tank 104 specifications are simply shown as an example and other sauce tank specifications/configurations may be used for executing the innovative process blocks of the present disclosure described below in detail.

In another aspect, the sauce tank 104 is operationally coupled or connected to the sauce feed pump 106. The sauce 120 based on the sauce raw materials 102 is pumped from the sauce tank 104 by the sauce feed pump 106 into the tumbler system 110, as described below. As an example, the sauce feed pump 106 may be a Graco SaniForce Model 1040 pump (without derogation of any third-party trademark rights) available from Graco Corp. The pump may have the following specifications: a flow rate 40 GPM (gallons per minute) with a maximum fluid press of 120 PSI (pounds per square inch); suction lift (wet) up to 29 feet; maximum solids of ⅛"; maximum viscosity of 10,000 CPS (centipoise); and compressed air supply 100 CFM (cubic feet per-minute) at 125 PSI. It is noteworthy that the sauce feed pump 106 specifications are simply shown as an example and other pump specifications/configurations may be used for executing the innovative process blocks of the present disclosure, described below in detail.

In yet another aspect, nitrogen 122 from the nitrogen supply unit 114 is provided to the tumbler system 110, as described below in detail. As an example, the nitrogen supply unit 114 may include an 11000-gallon storage tank, a 120-volt control valve and a 50 PSI stabilization system and liquid pressure controls. It is noteworthy that the nitrogen supply unit 114 specifications are simply shown as an example and other specifications/configurations may be used for executing the process blocks of the present disclosure.

In one aspect, as an example, the tumbler system 110 is a Gunther, tumbler, Model 2200 (without derogation of any third-party trademark rights) designed and manufactured by Gunther-Maschinenbau Corp. The tumbler system 110 includes a configurable control system (e.g. PLC Pilz model Pnoz mlp); has a capacity of 800-1000 pound and is configured to operate at 208 volt. The tumbler system 110 is configured with inlets to receive sauce 120 from the sauce feed pump 106, nitrogen 122 from the nitrogen supply unit 114 and water 124 from the water supply unit 118, as described below in detail. It is noteworthy that the tumbler system 110 specifications are simply shown as an example and other tumbler system specifications/configurations may be used for executing the innovative process blocks of the present disclosure, as described below in detail.

In one aspect, sauce raw materials 102 are poured and mixed at the sauce tank 104. The sauce raw materials are based on a recipe for a drink, and hence will vary based on the type of drink. The adaptive aspects of the present disclosure are not limited to any specific recipe or any specific type of drink. The sauce raw materials 102 are mixed in sauce tank 104 for a certain duration and provided to the sauce feed pump 106. The duration for mixing the sauce depends on the drink type.

The ice supply unit 108 provides ice 126 that is placed in the tumbler system 110. Ice 126 may include ice cubes, cylindrical shaped solid ice structures, hollow cylindrical shaped ice structures, solid cone shaped ice structures, irregular shaped ice structures or any other shape of ice structures. The adaptive aspects of the present disclosure are not limited to any specific shape or ice structure size. Before ice 126 is placed in the tumbler system 110, the tumbler system 110 goes through a pre-frost/freeze process. During this process, as an example, the temperature of the inside of the tumbler system 110 is set to about −80 degrees Fahrenheit. Ice 126 is kept in the tumbler system 110 for a certain duration (e.g. 15 minutes) such that the surface temperature of ice 126 is within a certain range, e.g. 0 to −3 degrees. Once a desirable surface temperature of the ice structure is reached, a coating process is executed, as described below in detail.

Briefly, the coating process involves alternating microcycles, during which the sauce 120 from the sauce feed pump 106 and nitrogen 122 from the nitrogen supply unit 114 are applied to ice 126 within the tumbler system 110. Applying the sauce 120 is referred to as the "sauce cycle" and applying nitrogen is referred to as the "freeze or frost cycle". Once the coating process is complete, the coated ice structures (e.g. cubes) are exposed to water 124 from the water supply unit 118 to encapsulate the ice structures. This makes the coated ice structures easier to pack and transport. This also prevents the ice from breaking when a drink is prepared. Details regarding the process steps of the present disclosure are provided below with respect to FIG. 2A.

Figure 2A:
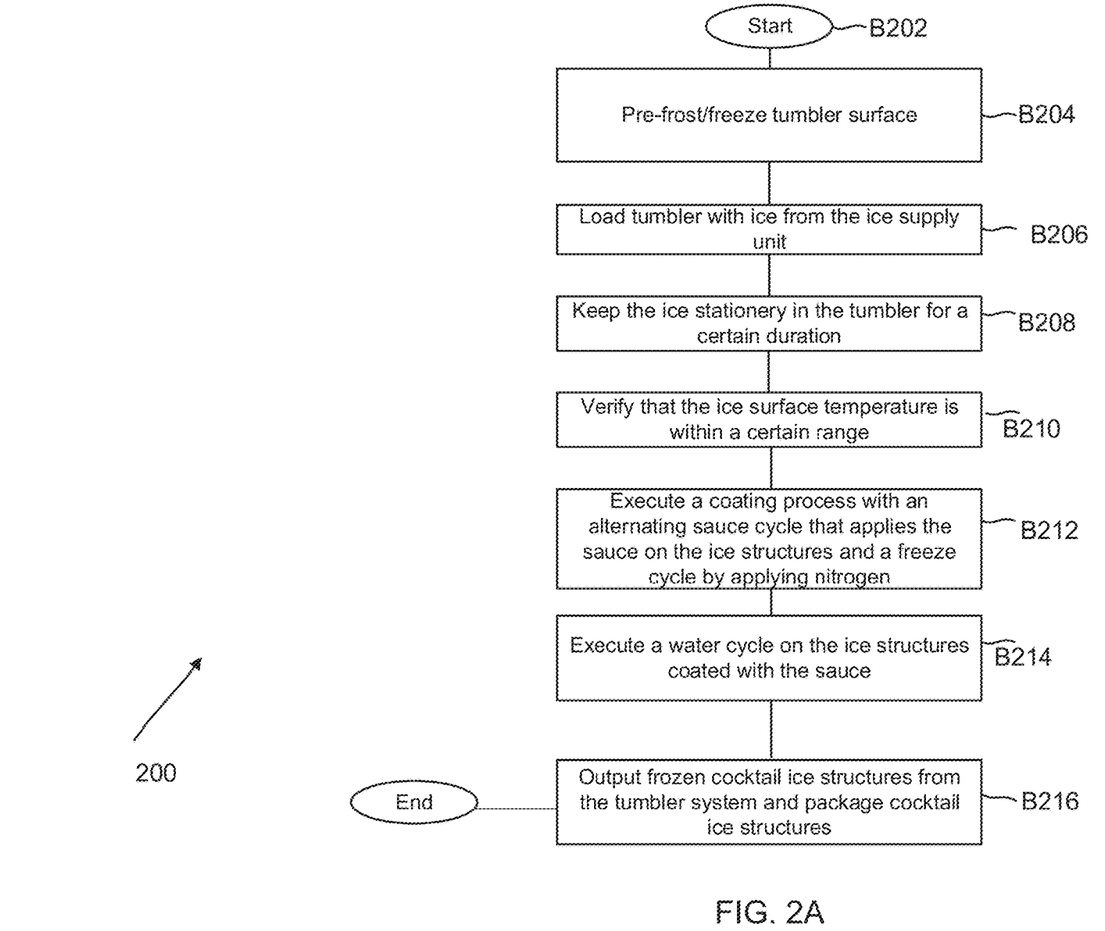
FIG. 2A shows an example of a process flow diagram for producing frozen cocktail ice structures, while reducing the likelihood of fracturing ice, according to one aspect of the present disclosure.

Process Flow: FIG. 2A shows a process 200 for producing frozen cocktail ice structures (may also be referred to as frozen craft cocktail structures), according to one aspect of the present disclosure. The process begins in block B202, when a cocktail recipe and its ingredients' have been determined for frozen cocktail ice structures. The sauce raw materials 102 are mixed in sauce tank 104 such that the sauce 120 is ready to be pumped by the sauce feed pump 106. It is noteworthy that the ingredients in the sauce 120 vary based on the recipe used for the frozen cocktail structures. For example, the ingredients for a smoothie will be different than ingredients for a specific type of margarita. The adaptive aspects of the present disclosure are not limited to any specific recipe or sauce material 102.

In block B204, the tumbler system 110 interior surface is set to a certain temperature, e.g. −80 degrees Fahrenheit. In block B206, ice 126 from the ice supply unit 108 are loaded into the tumbler system 110 for an ice tempering process. During the ice tempering process, ice 126 is kept stationery in block B208 for a certain duration, such that the surface of ice 126 reaches a certain temperature, e.g. between 0 to −3 degrees Fahrenheit. The ice surface temperature is verified in block B210, before a coating process can begin in block B212.

During the coating process, sauce 120 and nitrogen 122 are applied to ice 126 in alternating cycles referred to as micro-cycles. The sauce application is referred to as the sauce cycle, and the nitrogen application is referred to as the freeze cycle. The tumbler speed during the sauce cycle is about 18% at 15 rpm (revolutions per minute), and the tumbler speed during the freeze cycle is about 10% at 15 rpm. The adaptive aspects of the present disclosure are not limited to any specific tumbler speed.

During the freeze cycle the ambient temperature within the tumbler system 110 is maintained at about −30 degrees Fahrenheit, while the temperature of the ice 126 is maintained between −7 to −25 degrees Fahrenheit. The adaptive aspects of the present disclosure are not limited to any specific temperature.

As an example, the sauce cycle includes 1.05 pounds per second of sauce spray within a 12 second cycle. The sauce cycle includes 2.6% of sauce per cycle for about 25-30 sauce cycles. As an example, the freeze cycle includes 0.06 pounds per second of nitrogen spray with a 30 second cycle time. The sauce and freeze cycles are repeated until the sauce 120 has been consumed.

Once the coating process is completed, in block B214, a water cycle is executed when water 124 is injected into the tumbler system 110 from the water supply unit 118. As an example, the water cycle includes 0.8 pound per second of water spray with a cycle time of 12 seconds. The water cycle includes about 4.6% of water per cycle for about 21-22 cycles. Once the water cycle is completed, the frozen cocktail ice structures are output and packaged in block B216.

Figure 2B:
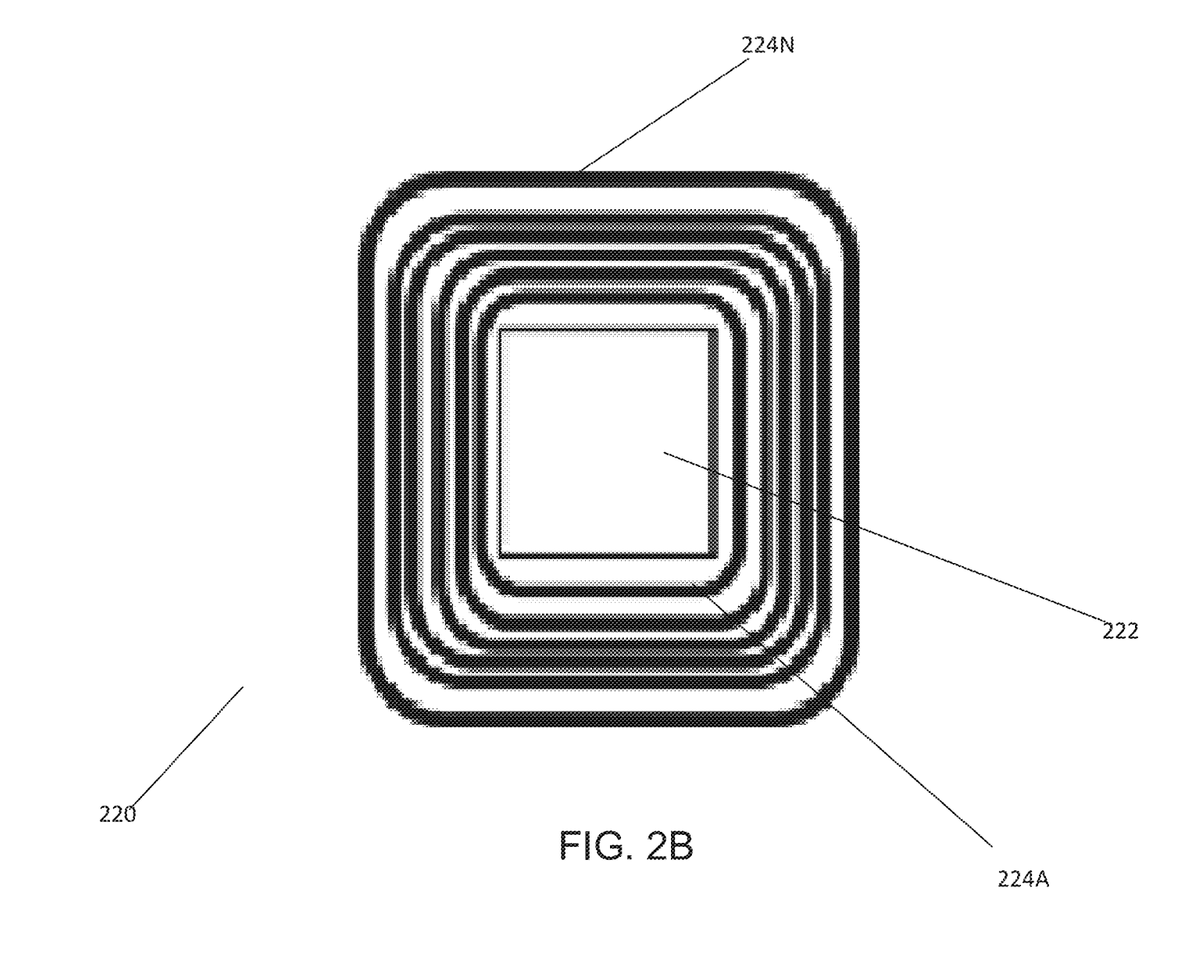
FIG. 2B shows a top view of an example of a frozen cocktail ice structure coated with sauce layers, according to one aspect of the present disclosure.

FIG. 2B shows an example of a coated ice structure 220. The ice structure 220 includes an ice structure 222 (e.g. an ice cube) 222 that is coated with various sauce layers 224A-224N using the coating process described above with respect to FIG. 2A.

Figure 2C:
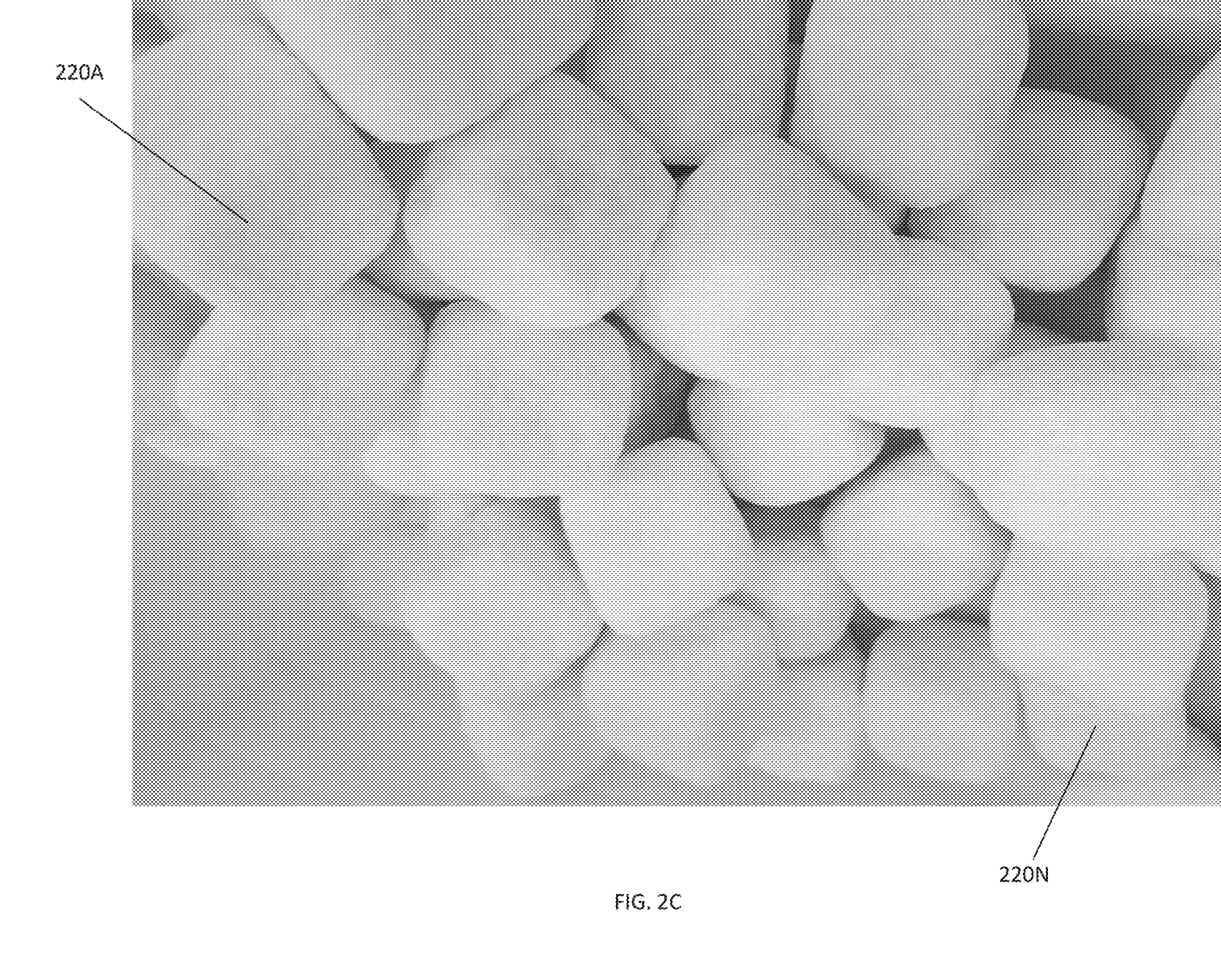
FIG. 2C shows an example of a plurality of frozen cocktail ice structures produced by the process of FIG. 2A, according to one aspect of the present disclosure.

FIG. 2C shows an example of a plurality of frozen cocktail ice structures 220A-220N. The frozen cocktail ice structures 220A-22N are produced using the system of FIG. 1 and the process of FIG. 2, described above in detail.

In one aspect, the technology disclosed herein enables coating an ice structure with ingredients for a cocktail or any other type of drink. The ice structures are not fractured, hence the sprayed sauce 120 remains in a frozen solid state. A user can simply unpack the frozen cocktail structures with the sprayed ingredients, place the frozen cocktail ice structures in a shaker (not shown), add liquor (or any other content), and then shake the contents in the shaker. Upon shaking, the sauce coating from the ice structures comes off, while the ice structures stay intact in the cocktail. As an example, a user could also use a blender to make a cocktail with the frozen cocktail ice structures. The adaptive aspects disclosed herein are not limited to using the shaker, blender or any other equipment type.

Figure 3:
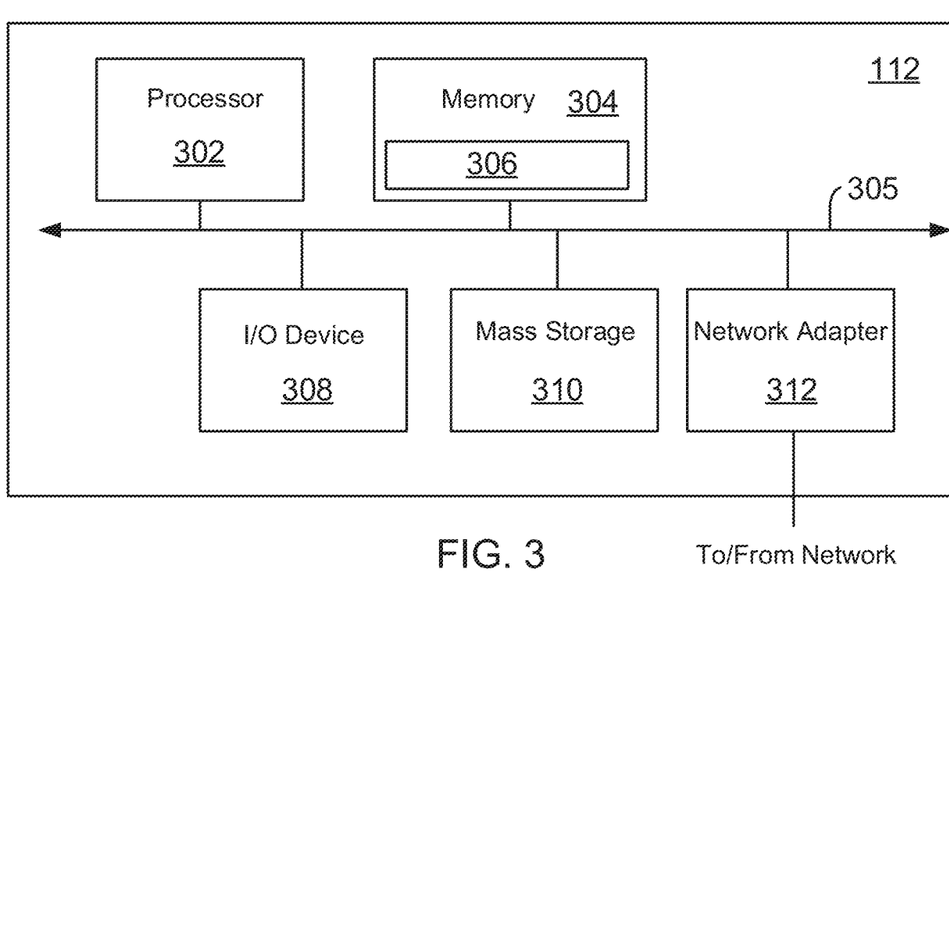
FIG. 3 shows an example of a controller for managing the process of FIG. 2A, according to one aspect of the present disclosure.

PLC 112: In one aspect, PLC 112 manages the various settings and controls for the sauce tank 104, the sauce feed pump 106, the tumbler system 110, the nitrogen supply unit 114 and the water supply unit 118. Processor executable instructions for controlling the various components of system 100 may be stored, for example, at a non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), solid state drive, memory stick or any other storage media, in accordance with the claimed subject matter.

In one aspect, PLC 112 includes one or more processors 302 and a memory 304, coupled to a bus system 305. The processors 302 are the central processing units (CPUs) and, thus, control PLC 112's overall operation. In certain aspects, the processors 302 accomplish this by executing programmable instructions stored in memory 304. As an example, processors 302 of PLC 112 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 304 of PLC 112 represents any form of random-access memory (RAM), read-only memory (ROM), flash memory, or the like, or a combination of such devices. The memory includes the main memory of PLC 112. Instructions 306 which implement the techniques of FIG. 2A may reside in and may be executed from the PLC memory 304 by processors 302

PLC 112 may include one or more internal mass storage device 310 and a network adapter 312. Internal mass storage device 310 may be or may include any conventional medium for storing data in a non-volatile manner, such as one or more magnetic or optical based disks, storage class memory, solid state drives or any other storage media. The network adapter 312 provides the PLC 112 with the ability to communicate with remote devices (e.g., storage servers) over a network and may be, for example, an Ethernet adapter, a FC adapter, or the like.

The PLC 112 also includes one or more input/output (I/O) devices 308 that may include, for example, a display device, a keyboard, a mouse, or any other device for receiving input/output commands for managing process 200.

In one aspect, methods and systems for producing cocktail ice structures are provided. One method includes setting a temperature of an interior surface of a tumbler below a desired temperature for an ice structure loaded into the tumbler; executing a sauce coating cycle for coating the ice structure with a sauce; executing a freeze cycle after the sauce coating cycle, by spraying nitrogen on the ice structure; alternating between the sauce coating cycle and the freeze cycle for applying sauce on the ice structure; and executing a water cycle for applying water on the ice structure coated with the sauce to produce a frozen cocktail ice structure.

In another aspect, a system is provided. The system includes a tumbler for receiving at least one ice structure; and a controller having a processor executing instructions out of a memory for alternating a sauce coating cycle that applies a sauce layer on the ice structure and a freeze cycle that occurs after the sauce coating cycle to spray nitrogen on the ice structure; and executing a water cycle for applying water on the ice structure coated with sauce for producing a frozen cocktail ice structure having sauce coated on the ice structure.

In yet another aspect, a frozen cocktail ice structure is provided. The frozen cocktail ice structure includes an ice structure coated with a plurality of sauce layers. The ice structure is coated with a first sauce layer during a sauce coating cycle, and after the sauce coating cycle, nitrogen is sprayed on the ice structure during a freeze cycle. The sauce coating cycle and the freeze cycle alternate for applying a plurality of sauce layers and nitrogen on the ice structure; and after a last freeze cycle, water is applied on the ice structure coated with the plurality of sauce layers.

Thus, a method and apparatus for producing frozen cocktail ice structures have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
setting a temperature of an interior surface of a tumbler below a desired temperature for an ice structure and loading the ice structure in the tumbler;
maintaining the ice structure stationery in the tumbler for a certain duration until a surface temperature of the ice structure is within a certain temperature range;
verifying the surface temperature of the ice structure;
in response to verifying the surface temperature, executing a sauce coating cycle by a programmable controller to coat the ice structure with a sauce in the tumbler operating at a first speed;
executing a freeze cycle by the programmable controller, after the sauce coating cycle, by spraying nitrogen on the ice structure in the tumbler operating at a second speed that is different from the first speed, while maintaining an ambient temperature within the tumbler that is different from a temperature range of the ice structure;
alternating between the sauce coating cycle and the freeze cycle by the programmable controller for applying sauce on the ice structure in the tumbler; and
executing a water cycle by the programmable controller for applying water in the tumbler on the ice structure coated with the sauce to produce a frozen cocktail ice structure.

2. The method of claim 1, wherein the certain temperature range is between 0 degrees Fahrenheit and—3 degrees Fahrenheit.

3. The method of claim 1, wherein during the freeze cycle, the ambient temperature within the tumbler is about −30 degrees Fahrenheit and the temperature range of the ice structure is between −7 to −25 degrees Fahrenheit.

4. The method of claim 1, wherein the first speed during the sauce coating cycle is about 18% at 15 RPM (revolutions per minute) and the second speed during the freeze cycle is about 10% at 15 RPM.

5. The method of claim 1, wherein the frozen cocktail ice structure is used for making an alcoholic drink.

6. The method of claim 1, wherein the frozen cocktail ice structure is used for making a non-alcoholic drink.

7. The method of claim 1, wherein the ice structure is an ice cube.

8. The method of claim 1, wherein the ice structure is of a non-cubic shape.

9. A frozen cocktail ice structure, comprising:
an ice structure coated with a plurality of sauce layers; wherein the ice structure is loaded in a tumbler whose interior surface temperature is preset to a temperature below a desired temperature for the ice structure, wherein for an ice tempering process, the ice structure upon being loaded is maintained in a stationery state for a certain duration until a surface temperature of the ice structure is within a certain range and upon verification of the ice structure surface temperature, the ice structure is coated with a first sauce layer during a sauce coating cycle in the tumbler operating at a first speed controlled by a programmable controller and after the sauce coating cycle, nitrogen is sprayed on the ice structure in the tumbler, during a freeze cycle controlled by the programmable controller, the tumbler operating at a second speed that is different from the first speed; wherein the sauce coating cycle and the freeze cycle alternate for applying the plurality of sauce layers and nitrogen on the ice structure in the tumbler; and after a last freeze cycle, water is applied in the tumbler on the ice structure coated with the plurality of sauce layers.

10. The frozen cocktail ice structure of claim 9, wherein the frozen cocktail structure is used for making an alcoholic drink.

11. The frozen cocktail ice structure of claim 9, wherein the frozen cocktail ice structure is used for making a non-alcoholic drink.

12. The frozen cocktail ice structure of claim 9, wherein the ice structure is an ice cube.

13. The frozen cocktail ice structure of claim 9, wherein the ice structure is a non-cubic shape.

14. A system, comprising:
a tumbler whose interior surface temperature is pre-set below a desired temperature of an ice structure loaded in the tumbler, wherein an ice tempering process is executed in the tumbler by maintaining the ice structure stationery in the tumbler for a certain duration until a surface temperature of the ice structure is within a certain temperature range; and
a controller having a processor executing instructions out of a memory for:
alternating between a sauce coating cycle in the tumbler operating at a first speed to apply a sauce layer on the ice structure, and a freeze cycle that occurs after the sauce coating cycle to spray nitrogen on the ice structure, wherein the tumbler operates at a second speed during the freeze cycle, the second speed being different from the first speed, and during the freeze cycle, an ambient temperature within the tumbler is different from a temperature range of the ice structure; and
executing a water cycle for applying water to the ice structure coated with sauce for producing a frozen cocktail ice structure having sauce coated on the ice structure.

15. The system of claim 14, wherein the certain temperature range during the ice tempering process is between 0 degrees Fahrenheit and—3 degrees Fahrenheit.

16. The system of claim 14, further comprising: a pump that provides the sauce layer to the tumbler for the sauce coating cycle.

17. The system of claim 14, further comprising: a nitrogen supply unit that supplies nitrogen for the freeze cycle in the tumbler.

18. The system of claim 14, wherein the frozen cocktail ice structure is used for making an alcoholic or a non-alcoholic drink.

19. The system of claim 14, wherein the ice structure is an ice cube.

20. The system of claim 14, wherein the ice structure is a non-cubic shape.

* * * * *